3,132,157
PROCESS FOR PREPARING ETHYLENE OXIDE BY CATALYTIC OXIDATION OF ETHYLENE WITH A HALOGEN PROMOTED SILVER CATALYST
Harry Hermann Alfred Endler and Eugenio Bulgarelli, Ferrara, Italy, assignors to Montecatini Società Generale per l'Industria Mineraria e Chimica, Milan, Italy
No Drawing. Filed Nov. 4, 1958, Ser. No. 771,724
Claims priority, application Italy Nov. 15, 1957
16 Claims. (Cl. 260—348.5)

This invention relates to processes for preparation of ethylene oxide by oxidation of ethylene with oxygen or air in the presence of a silver catalyst. It particularly concerns the use in such processes of silver catalysts so prepared that they have markedly increased selectivity in respect to formation of ethylene oxide, with significant diminution of the undesired complete oxidation of the ethylene to carbon dioxide.

In our U.S. Patent No. 2,825,701, issued March 4, 1958, we describe a process for producing olefine oxides, in particular ethylene oxide, by catalytic oxidation of the olefine by means of oxygen or gases containing same in the presence of silver catalysts obtained by co-precipitation of silver and earth-alkaline metal carbonates from the solutions of their salts.

It is known that the direct combination of ethylene with oxygen, either atmospheric or contained in an inert mixture, takes place within a wide range of concentrations or ratios of $O_2$ to $C_2H_4$, employing suitable catalysts such as silver or silver oxide. However, ethylene oxide is obtained together with marked amounts of carbon dioxide and water, due to the total combustion of ethylene, and with other side products such as aldehydes.

The object of the present invention is to employ a catalyst capable of imparting selectivity relative to the formation of ethylene oxide, to decrease the total combustion of ethylene.

A further object of the present invention is to provide a catalyst for this reaction, which, due to its improved activity, is capable of giving, under comparable conditions of synthesis, a higher conversion of ethylene to oxide, and therefore better utilization of ethylene than other known catalysts.

The present invention will be described with particular reference to the preparation of silver catalyst described in the U.S. Patent No. 2,825,701, according to which catalysts having a very high activity are obtained if the silver ion is co-preciptated from its aqueous solution together with other substances which cause a particularly fine crystalline precipitate. In practice, recourse is made to the co-precipitation of silver carbonates with earth-alkaline metal carbonates.

Said patent describes a carrier-based silver catalyst consisting of granular, porous siliceous refractory material as the carrier and a coating which penetrates into the interstices of the material and preferably consists of a homogeneous mixture of 20–30% of heat decomposition products of silver carbonate and 80–70% of calcium carbonate, said mixture preferably having a particle size of not more than 5 microns. All of the pertinent subject matter of said patent is incorporated here by reference.

It has now been found that the activity of the catalyst can be decisively directed towards the selective oxidation of ethylene to ethylene oxide, by adding to the aqueous solution of silver salt and other salts, before the co-precipitation of the carbonates, minimum but predetermined amounts of hydrohalogenic ions.

This discovery is rather surprising if one considers that halogen-containing substances in the reaction gas have a poisoning effect on the catalyst as far as the ethylene oxidation is concerned, which leads to destruction of the catalytic activity of silver, even when at minimum concentrations in the gases. The inhibitor action of 1,2-dichloroethane, when added to the reaction gases according to a known technique, is in point here. Such inhibitors have, in the long run, a poisoning effect, and therefore they do not cause an actual improvement in the catalyst.

In contrast, the addition of the halogen before the co-precipitation of silver and earth-alkaline carbonates, that is in the case of the embodying of small amounts of silver halide, in its turn co-precipitated with the catalytic mixture, determines a true improvement in the capacity of the resulting catalyst and, above all, a lasting improvement not bound to a further processing of the catalyst.

For the success of the sensitization of the silver catalyst, it is necessary that the added halogen be very small in amount. In practice, it is preferably of the order of 0.1 g.-atom of halogen per 100 g.-atoms of silver. If the commercial reactants used in the carbonate co-precipitation already contain halogen impurities in about the aforementioned ratio, it will be necessary, in order to succeed in carrying out the method according to the present invention, to subject the reactants to a careful de-halogenation before their use.

The term "conversion" used in the following examples means the ratio between the number of moles of ethylene oxide formed and the number of moles of ethylene fed. "Selectivity" or "yield" is the ratio between the moles of formed ethylene oxide and the moles of consumed or transformed ethylene. "Space velocity" means the normal unit volumes of gas which contact the apparent volume unit of catalyst per hour.

Preferred but non-limitative examples follow:

*Example 1*

20 g. silver nitrate and 80 g. calcium nitrate crystallized with 4 water moles, are dissolved in 1000 cc. water. Since chlorides are often present in calcium nitrate, the solution generally presents an opalescent aspect. Therefore, after agitation with filter paper fragments, or adsorbing substances, it is filtered.

At the same time a diluted sodium carbonate solution in water, with a concentration of 10% is prepared which, after purification by the addition of 1 g. silver nitrate, is filtered, thus eliminating the dark precipitate of silver oxide which also contains the halogen impurities, if any, coming from the sodium carbonate.

Before co-precipitating the silver and calcium carbonates, 6 cc. calcium chloride having a concentration of 1 g./liter are added to the nitrate solutions. After the co-precipitation of the carbonates, carried out by dropping the sodium carbonate solution onto the solution of nitrates, the precipitate is filtered, washed and dried in an oven at 108° C.

35 g. catalyst powder are obtained which is suspended in a 30% ethylene glycol aqueous solution and then used for the imbibition of 100 cc. porous green Carborundum (silicon carbide) aggregates having an average diameter of 3 mm., in a coated china cup. The method comprises the evaporation of this mixture to dryness on a water bath, while agitating.

The catalyst granules thus prepared are heated in a muffle kiln to 400° C. for 1 hour.

In contact with 100 cc. of this catalyst, a mixture of 3.6% ethylene in air is passed at a space velocity of 330 h.$^{-1}$, keeping the reactor at 220° C. A conversion to ethylene oxide of 48% is obtained, with a yield of 64%.

In a control run, the preparation of the catalyst is carried out in the same way but without the addition of calcium chloride before the co-precipitation of the carbonates. In the activity test of this catalyst, at a reaction temperature of 200° C., only a 30% conversion with a yield of 35% is obtained.

Example 2

400 cc. 10% silver nitrate aqueous solution are mixed with 190 cc. calcium nitrate aqueous solution with the same concentration. To the resulting solution, which is filtered in order to eliminate any silver halide present, 17 cc. aqueous potassium bromide having a concentration of 1 g./liter are added. The co-precipitation is carried out with 210 cc. 10% sodium carbonate aqueous solution, previously freed of the halide traces, if any, as described in Example 1. After filtering, washing and drying the precipitate at 108° C., 43.6 g. catalyst powder are obtained.

14 g. of this powder are suspended in a 30% aqueous glycol solution and left in a cup to impregnate 100 cc. of spherical Carborundum (6 mm. diameter), by evaporation on a water-bath while agitating. The catalyst granules are then heated to 400° C. in a muffle kiln for 1 hour.

The activity test carried out on 100 cc. of this catalyst with a synthesis mixture containing 3.6% ethylene, at a space velocity of 330° h.$^{-1}$, and at the reaction temperature of 220° C., results in a conversion of 49.3% and a yield of 60.1%.

In a control test carried out with a catalyst which has the same composition but does not contain the silver halide, a conversion of only 20% and a yield of 19.3% are obtained.

In order to better illustrate the dependence of the catalyst selectivity on the "sensitizing" halogen, a series of silver catalysts having the same composition as described in Example 1, to which calcium chloride varying from 0 mg. to 10 mg. were added, was prepared. The activity of these catalysts was determined with a run at 200° C. under the same conditions as described in Example 1, and is expressed by the data reported in the following table:

| Added CaCl$_2$, mg. | Cl mg. per g. atom Ag | Conversion, percent | Yield, percent |
| --- | --- | --- | --- |
| 0 | | 30.2 | 40 |
| 2 | 10.9 | 34.6 | 51 |
| 3 | 16.3 | 37.2 | 55.6 |
| 4 | 21.8 | 39.5 | 58 |
| 5 | 27.2 | 40 | 62 |
| 6 | 32.6 | 38.3 | 64 |
| 7 | 38.2 | 36.4 | 67.5 |
| 8 | 43.6 | 34.4 | 72.1 |
| 10 | 54.4 | 13.2 | 71.5 |

From this table it can be noted that the yield is directly proportional to the amount of halogen embodied in the silver catalyst, the conversion passing through a maximum value.

It is therefore demonstrated that the "sensitization" by means of halogens, while it is a means for increasing the conversion of the catalysts for the production of ethylene oxide, offers also the advantage of a lower ethylene consumption, due to an improvement in the selectivity.

It is understood that the present invention is not limited by the aforedescribed examples since it can be applied, in a similar way, to other catalysts based on silver, without departing from its meaning and scope.

As taught by Endler et al. Patent 2,825,701, at column 2, lines 55–57, the moist catalyst grains or granules can be heated in a drying oven at 200° to 500° C., before use in oxidation of ethylene.

The process, in its preferred form, is characterized as comprising the catalytic oxidation of ethylene with the aid of a catalyst based on silver obtained by co-precipitation from an aqueous solution of a silver salt with or without a soluble earth-alkaline salt, and, from an alkaline carbonate solution in molar amount higher than that of the silver salt, characterized in that the two starting solutions are previously purified from the halogen substances, if any, and then, small amounts of halide are added to the silver salt solution before the co-precipitation. The amount of halide to be added to the silver salt solution is in the order of 0.01 to 0.5 gram equivalent, preferably 0.1 gram equivalent, of halide per 100 silver g.-atoms, thus obtaining a catalyst which contains from 0.01 to 0.5 gram-equivalent of halide incorporated into 100 g.-atoms of silver, preferably 0.1 gram equivalent of halide incorporated into 100 g.-atoms of silver. The halogen donor can be any halide or hydrohalogenic acid soluble in water, being preferably an alkaline or earth-alkaline halide.

We claim:
1. A process of making ethylene oxide comprising oxidizing ethylene by treating it with a free oxygen-containing gas in the presence of a silver halide containing silver catalyst, the catalyst being prepared by reacting an aqueous solution of silver nitrate and a halide with an alkali carbonate, the halide being taken from the group consisting of hydrohalides and alkali and alkaline earth halides, the halogen of which is taken from the group consisting of chlorine and bromine, the halide being present in the solution in an amount from 0.01 to 0.5 gram-equivalent per 100 gram-atoms of silver, and heating the precipitate at 200° C. to 500° C.

2. The process of claim 14, the halide being calcium chloride.

3. The process of claim 14, the halide being potassium bromide.

4. The process of claim 14, the carbonate being sodium carbonate.

5. A process of making ethylene oxide comprising oxidizing ethylene by treating it with a free oxygen-containing gas in the presence of a silver halide containing silver catalyst, the catalyst being prepared by reacting an aqueous solution of alkali carbonate, silver nitrate, an alkaline-earth metal nitrate, and a halide, the halide being taken from the group consisting of hydrohalides and alkali and alkaline earth halides, the halogen of which is taken from the group consisting of chlorine and bromine, the halide being present in the solution in an amount from 0.01 to 0.5 gram-equivalent per 100 gram-atoms of silver, and heating the precipitate at 200° C. to 500° C.

6. In a process of producing ethylene oxide by catalytic oxidation of ethylene with a free oxygen-containing gas, in which a mixture of the oxygen-containing gas and ethylene is passed in contact with a silver halide containing silver catalyst, the improvement comprising employing as said catalyst one prepared by co-precipitating an aqueous solution of silver nitrate and calcium chloride with sodium carbonate, the calcium chloride being present in the aqueous solution in an amount of from 0.01 to 0.5 gram equivalent per 100 gram-atoms of silver, and heating the precipitate at 200° C. to 500° C.

7. In a process of producing ethylene oxide by catalytic oxidation of ethylene with a free oxygen-containing gas, in which a mixture of the oxygen-containing gas and ethylene is passed in contact with a silver halide containing silver catalyst, the improvement comprising employing as said catalyst one prepared by co-precipitating an aqueous solution of silver nitrate, calcium nitrate, and calcium chloride with sodium carbonate, the calcium chloride being present in the aqueous solution in an amount of from 0.01 to 0.5 gram equivalent per 100 gram-atoms of silver.

8. In a process of producing ethylene oxide by catalytic oxidation of ethylene with a free oxygen-containing gas, in which a mixture of the oxygen-containing gas and ethylene is passed in contact with a silver halide containing silver catalyst, the improvement comprising employing as said catalyst one prepared by co-precipitating an aqueous solution of silver nitrate, calcium nitrate, and calcium chloride with sodium carbonate, the calcium chloride being present in the aqueous solution in an amount of from one to ten milligrams per 20 grams of silver nitrate.

9. In a process of producing ethylene oxide by catalytic oxidation of ethylene with a free oxygen-containing gas, in which a mixture of the oxygen-containing gas and ethylene is passed in contact with a silver halide containing silver catalyst, the improvement comprising employing as said catalyst one prepared by co-precipitating an aqueous solution of silver nitrate and alkaline-earth metal nitrate with alkali metal carbonate, said nitrates and the said carbonate having been previously treated to remove halogen impurities therein, the said co-precipitating being in the presence of alkaline-earth metal halide which is added to the aqueous solution in an amount of from 0.01 to 0.5 gram equivalent per 100 gram-atoms of silver, the halogen of the said halide being taken from the group consisting of chlorine and bromine.

10. In a process of producing ethylene oxide by catalytic oxidation of ethylene with a free oxygen-containing gas, in which a mixture of the oxygen-containing gas and ethylene, is passed in contact with a silver halide containing silver catalyst, the improvement comprising employing as said catalyst one prepared by co-precipitating an aqueous solution of silver nitrate and alkaline-earth metal nitrate with alkali metal carbonate, said nitrates and the said carbonate having been previously treated to remove halogen impurities therein, the said co-precipitating being in the presence of alkali metal halide which is added to the aqueous solution in an amount of from 0.01 to 0.5 gram equivalent per 100 gram-atoms of silver, the halogen of the said halide being taken from the group consisting of chlorine and bromine.

11. The process of claim 1, the halide being potassium bromide.

12. A process of making ethylene oxide comprising oxidizing ethylene by treating it with a free oxygen-containing gas in the presence of a silver halide containing silver catalyst, the catalyst being prepared by reacting an aqueous solution of silver nitrate and a halide with an alkali carbonate, the halide being taken from the group consisting of hydrohalides and water-soluble alkali and alkaline earth halides, the halogen of which is taken from the group consisting of chlorine and bromine, the halide being present in the solution in an amount from 0.01 to 0.5 gram-equivalent per 100 gram-atoms of silver, and heating the precipitate to dry it, forming a suspension of the mixture in a liquid and coating particles of a carrier therewith.

13. The process of claim 12, the carrier being silicon carbide porous aggregate.

14. A process of making ethylene oxide comprising oxidizing ethylene by treating it with a free oxygen-containing gas in the presence of a silver halide containing silver catalyst, the catalyst being prepared by reacting an aqueous solution of alkali carbonate, silver nitrate, an alkaline-earth metal nitrate, and a halide, the halide being taken from the group consisting of hydrohalides and water-soluble alkali and alkaline earth halides, the halogen of which is taken from the group consisting of chlorine and bromine, the halide being present in the solution in an amount from 0.01 to 0.5 gram-equivalent per 100 gram-atoms of silver, and heating the precipitate to dry it, forming a suspension of the mixture in a liquid, coating particles of a carrier therewith.

15. The process of claim 14, the halide being calcium chloride, the carbonate being sodium carbonate.

16. The process of claim 14, the halide being potassium bromide, the carbonate being sodium carbonate.

References Cited in the file of this patent

UNITED STATES PATENTS

| | | |
|---|---|---|
| 2,463,228 | West et al. | Mar. 1, 1949 |
| 2,615,900 | Sears | Oct. 28, 1952 |
| 2,709,173 | Brengle et al. | May 24, 1955 |
| 2,765,283 | Sacken | Oct. 2, 1956 |
| 2,825,701 | Endler et al. | Mar. 4, 1958 |

FOREIGN PATENTS

| | | |
|---|---|---|
| 531,127 | Canada | Oct. 2, 1956 |

OTHER REFERENCES

Pokrovskii: Uspekhi Khim, vol. 21, pp. 785–807 (1952), (translation, RJ–131, by Associated Technical Services, Inc., pages 15 and 27 relied on).